United States Patent
Berlioz et al.

[11] Patent Number: 6,108,595
[45] Date of Patent: Aug. 22, 2000

[54] AIRCRAFT POSITION INDICATOR DEVICE

[75] Inventors: Raymond Jacques Gérard Berlioz, Salon-de-Provence; Vincent Frédéric Saintagne, Velaux; Joël Christian Roger Astruc, Puyricard, all of France

[73] Assignee: Eurocopter, Marignane Cedex, France

[21] Appl. No.: 09/102,618

[22] Filed: Jun. 23, 1998

[30] Foreign Application Priority Data

Jun. 23, 1997 [FR] France ................................. 97 07767

[51] Int. Cl.$^7$ ........................... G06F 19/00; G06G 7/70
[52] U.S. Cl. ................... 701/16; 701/14; 701/15; 340/951; 340/952; 340/953
[58] Field of Search ................. 701/16, 14, 35, 701/120, 121, 200, 204, 206, 207; 342/453, 450, 454, 159; 340/951, 953, 952, 950; 244/114 R; 73/178 R, 178 T

[56] References Cited

U.S. PATENT DOCUMENTS

| | | | |
|---|---|---|---|
| 4,249,158 | 2/1981 | Basov et al. | 340/26 |
| 4,259,658 | 3/1981 | Basov et al. | 340/26 |
| 4,702,698 | 10/1987 | Beckwith et al. | 434/2 |
| 4,746,924 | 5/1988 | Lightfoot | 342/453 |
| 5,369,589 | 11/1994 | Steiner | 701/200 |
| 5,375,058 | 12/1994 | Bass | 701/120 |

FOREIGN PATENT DOCUMENTS 1 179 725  10/1964  Germany .

*Primary Examiner*—Jacques Louis-Jacques
*Attorney, Agent, or Firm*—Fisher, Christen & Sabol

[57] ABSTRACT

The present invention concerns a device for indicating the position of an aircraft (H) notably a helicopter (H) with respect to a beam (F).

In accordance with the invention, said indicator includes fixed first means (6) indicating the position of said aircraft (H), movable second means (7) indicating the position of the beam (F) in a predefined direction with respect to said aircraft (H), and third means (8) indicating which way to steer the aircraft (H) in the predefined direction to capture the beam (F) to said third means (8) being activated only when the aircraft (H) has crossed the beam (F) completely and is outside it.

9 Claims, 2 Drawing Sheets

AIRCRAFT POSITION INDICATOR DEVICE

BACKGROUND OF THE INVENTION

1. Field of the Invention

The invention relates to an aircraft position indicator device.

Such a device is more specifically adapted to a rotary wing aircraft, notably a helicopter.

Although not exclusively, it is particularly well suited to indicating the position of an aircraft with respect to a guiding beam transmitted by a radio beacon on the ground close to a runway, facilitating the capture and tracking of said guiding beam by the aircraft on landing, and therefore constitutes an appreciable aid to the pilot.

2. Background Art

In a manner that is known in itself, an ordinary indicator of this type indicates the angular deviation in a vertical or horizontal plane between the aircraft equipped with said indicator and the axis of the guiding beam. Using such an indicator, it is therefore possible to determine at any time the current position of the aircraft with respect to said guiding beam.

However, it reveals nothing about possible interception of the guiding beam by the aircraft.

So when the interception occurs close to the source of transmission of the guiding beam, where the width of said beam is low, the aircraft can cross it without the crew realizing it, which notably risks causing erroneous interpretation of the trajectory of the aircraft.

Consequently, to avoid such potentially dangerous erroneous interpretation, pilots must continuously monitor said conventional indicators, which monopolizes their attention and thus distracts them from flight control.

BROAD DESCRIPTION OF THE INVENTION

The present invention relates to a device for indicating the position of an aircraft, notably a helicopter, with respect to a (preferably) electro-magnetic beam, the object of the indicator being to overcome the aforementioned drawbacks.

To this end, according to the invention, said indicator which is mounted on said aircraft and which comprises:

a detection unit comprising at least one sensor capable of detecting said beam; and a display unit connected to said detection unit, is remarkable in that said detection unit determines the position of said aircraft with respect to said beam in at least one predefined direction, preferably the horizontal or vertical direction, and detects complete crossing of said beam by said aircraft, and in that said display unit comprises:

fixed first means indicating the position of said aircraft;

movable second means indicating the position of said beam in said predefined direction with respect to said aircraft, the distance between said first and second means being proportional to the angular deviation between said aircraft and said beam as seen from the point of transmission of said beam in said predefined direction; and third means indicating the direction of movement of said aircraft in said predefined direction to capture said beam, said third means being activated only when said aircraft has completely crossed said beam and is located outside said beam.

Thus, by means of the invention, when the aircraft crosses said beam, which is preferably real and electromagnetic but which can equally be virtual, said third means are activated so that the pilot of the aircraft is directly and automatically informed of this crossing, even if the latter occurs very fast, thereby overcoming the aforementioned drawbacks.

In addition, the pilot is informed directly by said third means of which way the aircraft must be steered in said predefined direction to capture said beam, which facilitates pilots' decision taking processes and notably avoids them having to interpret various information to deduce the direction of interception.

Consequently if said (electromagnetic) beam, preferably a radio beam, is a landing guide beam, said indicator notably enables the pilot to be alerted to an abnormal situation in the landing procedure.

The invention can be implemented simultaneously for two or more different predefined directions, of course.

In addition, and advantageously:

said display unit comprises a fixed scale equipped at its center with said fixed first means, said movable second means being movable over said scale; and/or said third means comprise, for each of the two ways the aircraft can move in said predefined direction, at least one arrow inserted if necessary so that its point indicates the direction of movement of the aircraft in order to capture the beam, which provides a simple, effective display of which way to move.

In addition, in one particular embodiment, it is assumed that said beam is a virtual beam generated by a computer and the detection unit determines said angular deviation from the actual measured position of the aircraft and the known position of said virtual beam.

In addition, in another embodiment, the position indicator in accordance with the invention indicates the distance between the aircraft and a curve representing the axis of a corridor. The sides of this corridor are located at a predefined distance from said curve and said curve is formed either from several interlinked rectilinear beams or from a continuous varying curve defined by said beam.

BRIEF DESCRIPTION OF THE DRAWINGS

The figures in the accompanying drawings will show clearly how the invention can be put into effect. In these figures, identical references denote similar elements.

DETAILED DESCRIPTION THE INVENTION

Figure 1:
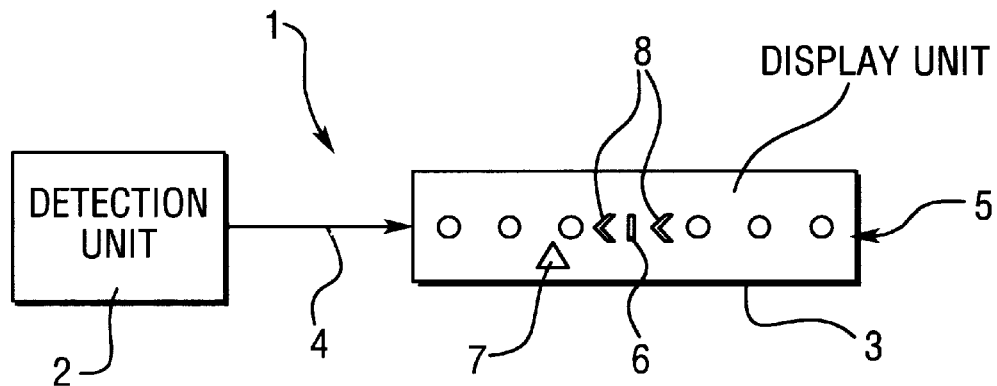
FIG. 1 is a schematic illustration of an indicator according to the invention.

The position indicator 1 according to the invention and shown schematically in FIG. 1 is mounted on an aircraft, for example a helicopter H, and is designed to indicate to the pilot(s) of said aircraft H, among other things, the position of the aircraft H with respect to an electromagnetic beam F.

To this end said indicator 1 includes, in a manner known in itself:

a detection unit 2 including at least one integrated sensor capable of detecting said electromagnetic beam F; and a display unit 3 installed in the cockpit of the aircraft H (not shown) and connected to said detection unit 2 by a link 4.

According to the invention said detection unit 2 determines the position of said aircraft H with respect to said electromagnetic beam F in a predefined direction, the horizontal direction in the example in FIG. 2, and detects complete crossing of said electromagnetic beam F by said aircraft H, as described below with reference to FIG. 2.

Figure 2:
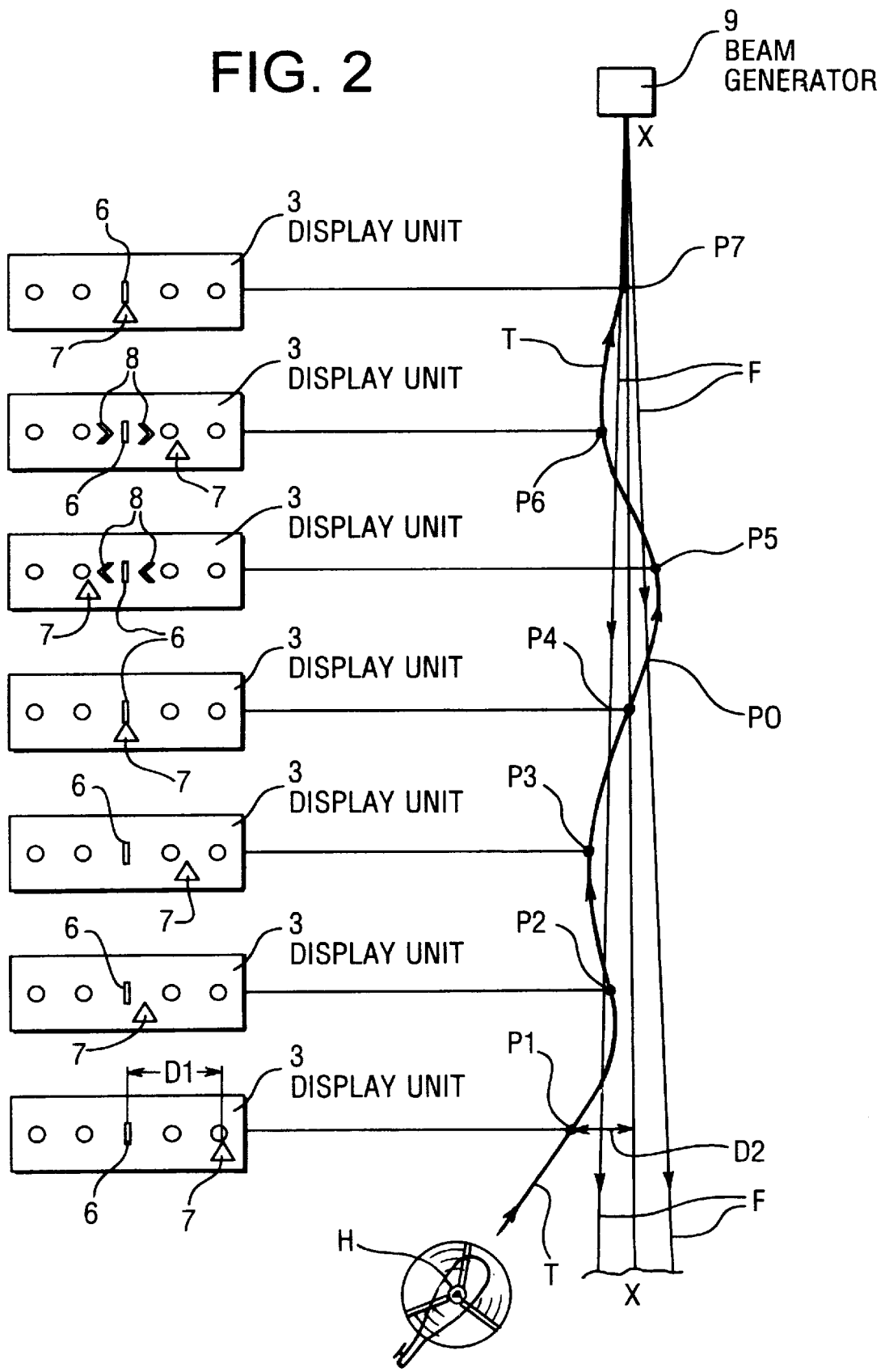
FIG. 2 illustrates the use of the invention in the context of landing a helicopter.

In addition, according to the invention, said display unit 3 includes, for showing information on a display screen:

- a fixed scale 5 illustrating the predefined direction, i.e. the horizontal direction in the example given in FIG. 2, taken into account for the position indication;
- a characteristic sign 6, in this instance a fixed vertical bar at the center of the scale 5 which indicates the position of the aircraft H;
- a characteristic sign 7, in this instance a movable triangle which indicates the position of said beam F with respect to said aircraft H in said horizontal direction; and
- at least one characteristic sign 8, in this instance a pair of arrows, which indicates which way to steer said aircraft H in said predefined direction to capture said beam F.

According to the invention said characteristic sign 8 for indicating which way to steer in said predefined direction is activated only when the aircraft H has completely crossed said beam F and is located outside said beam F, as can be seen with reference to FIG. 2.

Thus, by means of the invention, when the aircraft H crosses said electromagnetic beam F said characteristic sign 8 is activated so that the pilot of the aircraft H is directly and automatically notified of this crossing, even if it is very fast, which enables the pilot to accomplish the interception.

In addition the pilot is informed directly and simply by said characteristic sign 8 which way the aircraft H must be steered in the predefined direction to capture said beam F, which facilitates the pilot's decision taking and notably avoids the need to interpret various information to deduce from it which way to steer in which direction to achieve the interception.

In the context of the present invention the position indication can equally be accomplished in another predefined direction, for example the vertical direction, or simultaneously in two or more predefined directions, either on the same screen or on separate screens.

FIG. 2 shows:

- the simultaneous projection onto a horizontal plane of the track T of the helicopter H and the electromagnetic beam F, for example a radio beam, emitted by a beam generator 9; and
- the indications displayed on said display unit 3 for different positions P1 to P7 of the helicopter H on the track T in the course of capture of said beam F.

Said beam generator 9 can be a transmitting beacon on the ground close to a runway (not shown) and emitting said beam F to guide the pilot of the helicopter H when landing.

As can be seen in FIG. 2 the distance D1 between the characteristic signs 6 and 7 displayed is proportional to the angular deviation between the position P1 of the helicopter H and the axis X—X of the beam F as seen from the beam generator 9, which is illustrated by a double-headed arrow D2.

Thus the display unit 3 also gives a direct indication of the angular deviation between the helicopter H and the beam F as seen from the beam generator 9.

In the example illustrated in FIG. 2 the characteristic signs 8 are activated, according to the invention, only when the helicopter H has crossed the beam F completely from the point P0 on the track T.

Note that for positions P5 and P6 the helicopter H is on opposite sides of the axis X—X of the beam F so that the corresponding characteristic signs 8 are in respective opposite directions.

When the position indicator 1 is activated the helicopter H has not yet crossed the beam F, even if it is outside it. Similarly, on a change of the source of the beam F the position indicator 1 is also initialized as never having crossed the beam F, which avoids the indicator being activated at the wrong time.

Figure 3:
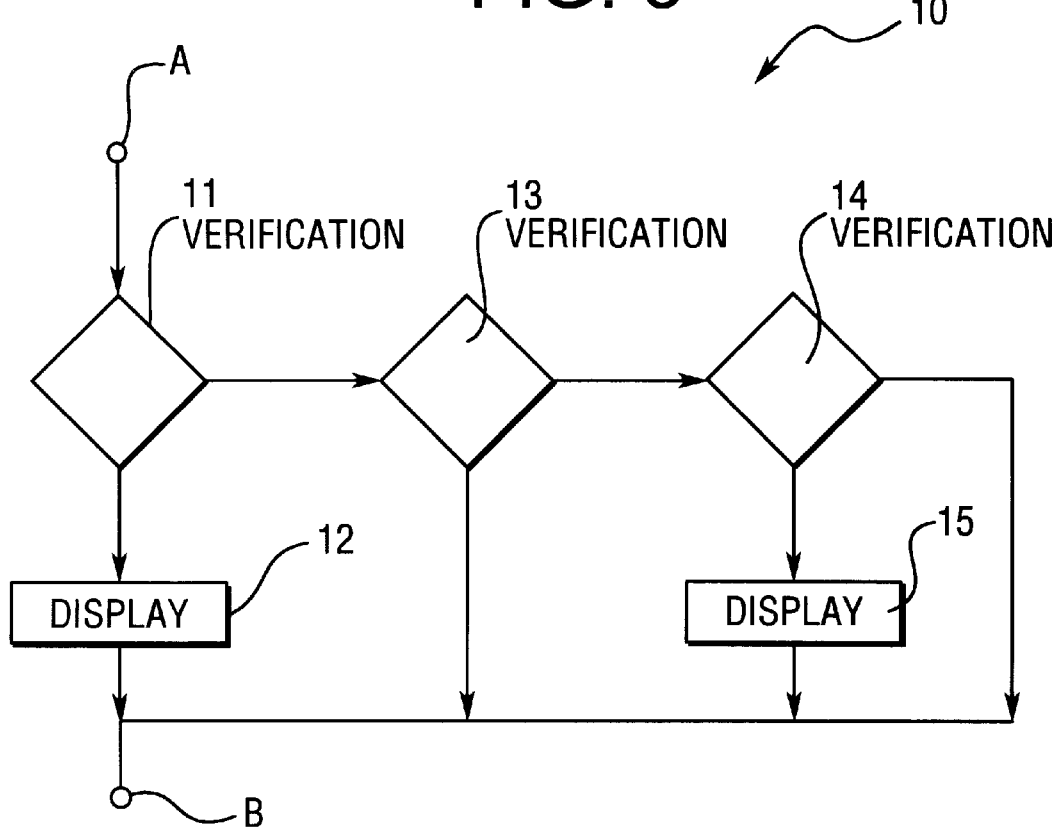
FIG. 3 is a flowchart showing the general organization of the information presentation function of an indicator according to the invention.

The general organization of the information presentation function of the display unit 3 of the device 1 according to the invention is described below with respect to the flowchart 10 shown in FIG. 3.

Between the start A and the end B of said presentation function implemented for a determined position P1 to P7 of the aircraft H the following operations are carried out:

- verify (11) whether the aircraft H is in the beam F; and
- if it is, and if appropriate, cause the characteristic sign 8 displayed on the display unit 3 to disappear (12), for example between positions P6 and P7;
- if it is not, verify (13) whether the characteristic sign 8 is already displayed:
  - if it is, stop the presentation function in progress for the current position; and
  - if it is not, carry out a final verification (14).

For this final verification, was the aircraft H in said beam F in the previous position?

- if it was not, the presentation function in progress for the current position considered is stopped.
- if it was, the corresponding characteristic sign 8 is caused to appear at 15, obviously if the aircraft H has completely crossed said beam F.

What is claimed is:

1. An indicator device for indicating position of an aircraft, notably a helicopter, with respect to at least one beam, said at least one beam being obtained from a taxiway, a appropriate source, said indicator being mounted on said aircraft and comprising:

a detection unit including at least one sensor capable of detecting said beam; and a display unit linked to said detection unit, wherein said detection unit determines the position of said aircraft with respect to said beam in at least one predefined direction and detects when said aircraft crosses said beam completely and said display unit includes:

fixed first means for indicating the position of said aircraft;

movable second means for indicating position of said beam in said predefined direction with respect to said aircraft, distance between said first and second means being proportional to angular deviation between said aircraft and said beam as seen from point of transmission of said beam in said predefined direction; and third means indicating which way to steer said aircraft in said predefined direction to capture said beam, said third means being activated only when said aircraft has crossed said beam completely and is outside of the beam.

2. The indicator claimed in claim 1, wherein said display unit includes a fixed scale equipped at its center with said fixed first means, said movable second means being movable over said scale.

3. The indicator claimed in claim 1, wherein said third means include, for each way said aircraft can be steered in said predefined direction, at least one arrow inserted if necessary so that its point indicates direction in which to steer said aircraft in order to capture said beam.

4. The indicator claimed in claim 1, wherein said predefined direction is horizontal direction.

5. The indicator claimed in claim 1, wherein said predefined direction is vertical direction.

6. The indicator claimed in claim 1, wherein said beam is an electromagnetic beam.

7. The indicator claimed in claim 6, wherein said electromagnetic beam is a radio beam.

8. The indicator claimed in claim 1, wherein said beam is a virtual beam generated by a computer.

9. The indicator claimed in claim 1, wherein said beam is a curve defining a corridor, the sides of which are at a predefined distance from said curve.

* * * * *